Figure 1:
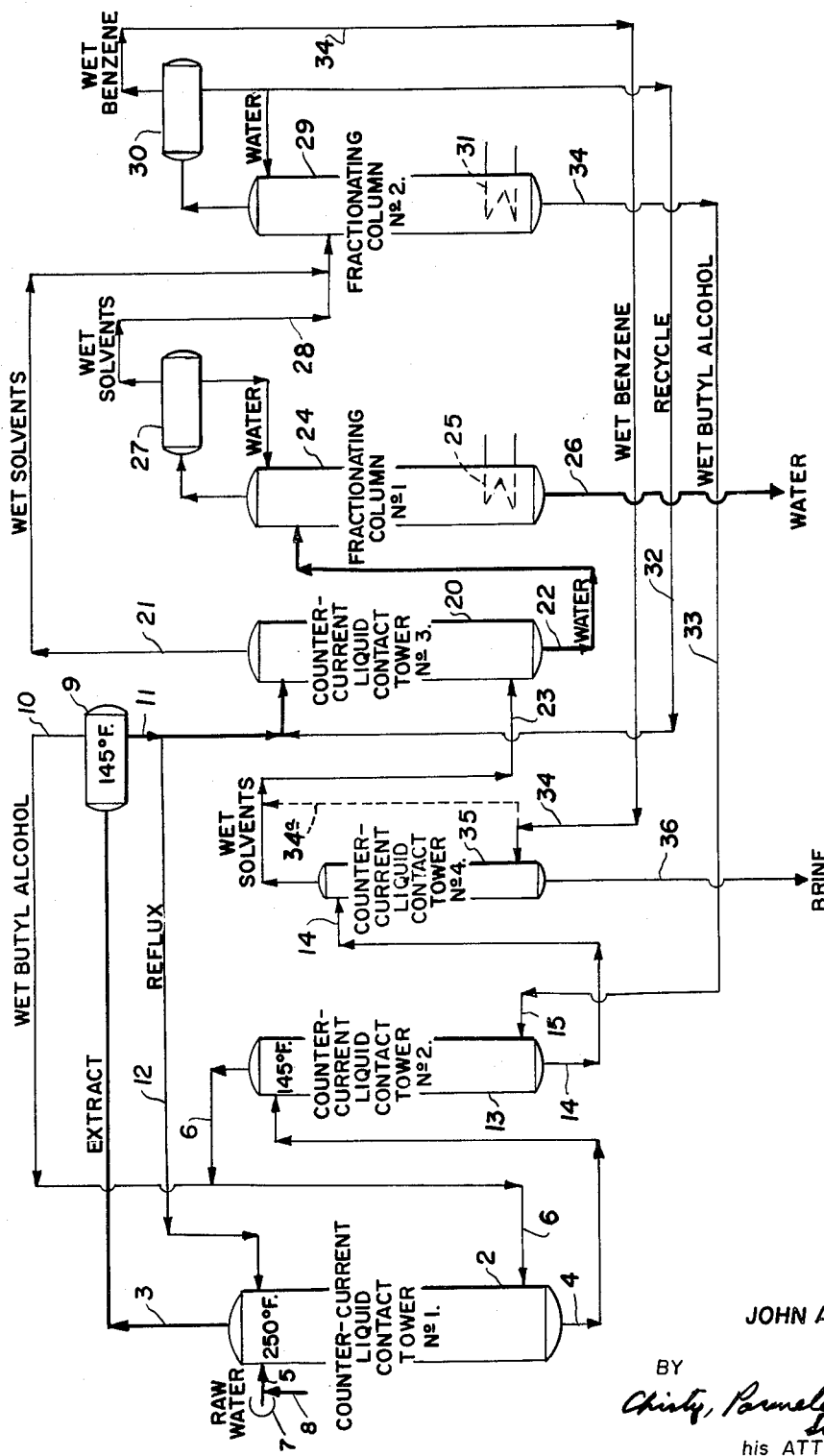

March 8, 1966    J. A. PATTERSON    3,239,459
SEPARATION OF WATER FROM SALINE SOLUTION
Filed Dec. 3, 1962    2 Sheets-Sheet 1

INVENTOR.
JOHN A. PATTERSON
BY Christy, Parmelee & Strickland
his ATTORNEYS

March 8, 1966 J. A. PATTERSON 3,239,459
SEPARATION OF WATER FROM SALINE SOLUTION
Filed Dec. 3, 1962 2 Sheets-Sheet 2

INVENTOR.
JOHN A. PATTERSON
BY
Christy,
Parmelee &
Strickland
his ATTORNEYS

United States Patent Office 3,239,459
Patented Mar. 8, 1966

3,239,459
SEPARATION OF WATER FROM SALINE SOLUTION
John A. Patterson, Canonsburg, Pa., assignor to Patterson Hydro Chemical Corporation, Pittsburgh, Pa., a corporation of Pennsylvania
Filed Dec. 3, 1962, Ser. No. 241,682
20 Claims. (Cl. 210—21)

This application is a continuation-in-part of copending application Serial No. 174,477, filed February 20, 1962, now abandoned.

This invention relates to the extraction of water from a saline solution and is for a method of and apparatus for the extraction of water through the use of a liquid solvent.

The invention, while applicable to any aqueous solution of an inorganic or mineral salt, has primary application to naturally occurring solutions wherein sodium chloride is the predominant salt, as for example sea water, so that when such a solvent is brought into intimate ticularly with reference to desalting sea water, but this is by way of illustration and not by way of limitation.

It has been recognized that certain organic liquid solvents will enter into solution with water, but will have little or no affinity for salt carried in solution by the water, so that when such a solvent is grough into intimate contact with sea water, there may be produced two solutions, one in which water is dissolved in the solvent with little or no salt, and one comprising water with some solvent and practically all of the salt. Practical use of this phenomenon of selective solubility has been given little importance in rectifying sea water because of the difficulty of economically separating the solvent from the two resulting solutions; the nature of the organic solvent which is inherently expensive, and the relatively high fuel costs in operating such a plant. Practical attention has therefore been largely directed to other desalination methods, such as evaporation procedures or refrigerating processes.

According to the present invention, I employ first a hydrophilic organic solvent to effect an initial division of the salt water into two phases, one being solvent carrying water in solution but little or no salt, and the second being water in which some solvent is carried along with the salt that is rejected when the water is dissolved by the solvent. Subsequently I use a hydrophobic organic solvent, that is one which has little or no affinity for water, but which will readily dissolve the hydrophilic solvent first used. The second solvent rejects the water and enters into solution with the first solvent, the mixed solvents being then easily separated at least to a substantial extent by gravity from the water.

Through this use of a hydrophilic solvent succeeded by the use of a hydrophobic solvent I am enabled to produce potable water having only a trace of the solvents, a brine having only a trace of the second solvent and practically none of the first, and a solution of the two solvents. The two solvents are then separated for reuse, as by fractional distillation, and the trace of solvent, if any, in the potable water can be removed by heating the water to a temperature where the second solvent is vaporized.

Additionally, as the hydrophilic solvent, I prefer one that will have a greater capacity for dissolving water at elevated temperature so that the initial contact of the sea water and solvent is effected under pressure above the normal boiling point of water while, in a subsequent step, contact is made where the liquids are cooler, tending to release dissolved water for which the cooler solvent then has not capacity.

The hydrophilic solvent preferably is an alcohol having a boiling point at or above the boiling point of water and which desirably has a much higher capacity to dissolve water when it is above the normal boiling point of water than at temperatures around 145° F. A most desirable solvent is normal butyl alcohol (hereinafter referred to as butyl alcohol), which will be sometimes herein referred to as solvent A. Other primary solvents miscible with water and hydrocarbons, sometimes referred to as polar compounds characterized by terminal groups containing oxygen attached to a hydrocarbon radical, are certain ketones, for example methyl ethyl ketone and the more soluble aldehydes. The solubility of water in such compounds with the rejection of the salt is attributable to the hydrophilic property of the terminal oxygen containing group, but the greater affinity for the secondary solvent is due to the hydrocarbon group. Thereenumerated having a hydrocarbon group with more than two carbon atoms and one terminal hydroxyl or oxygen containing terminal group have the desired selective character, having both hydrophilic and strongly hydrophobic groups. The second solvent, which is not readily miscible with water but will dissolve solvent A and which has a lower boiling point than water, is preferably a liquid hydrocarbon, some examples of which are hexane, heptane, cyclohexane, cycloheptane, and benzene. Benzene is preferable at this time because of its low cost and availability and generally satisfactory properties for the purpose, although if cost could be disregarded, some others above listed would perhaps be preferable.

The apparatus for practicing the invention comprises a novel organization of countercurrent flow liquid contacting structures, decanting vessels and fractionating stills, the stills being for the removal of traces of solvent from the potable water and the separation of the two organic solvents, along with pumps and piping to effect the foregoing sequence of steps. The organization further comprises heat exchangers for the conservation of heat and to decrease the cost of operation. Additional apparatus may be used where economics so justify, such as a compressor system for increasing the temperature of vapors passing into heat exchangers.

A principal object of the invention is to provide a novel method of and apparatus for extracting or separating water from an aqueous salt solution by selective solvent extraction. While primarily useful for the recovery of water, the invention may be used to produce a concentrated brine where the recovery of the salt is important.

A further important object is to provide a method and apparatus for this purpose utilizing in succession a hydrophilic and hydrophobic solvent.

A further important object is to provide a method and apparatus for the extraction of water from an aqueous salt solution utilizing relatively inexpensive solvents and with a relatively unimportant loss of solvents.

A further object is to provide a method and apparatus for this purpose designed to provide a relatively large capacity with a relatively low capital investment and operating cost.

These and other objects and advantages of the invention will be apparent to those skilled in the art from the accompanying detailed description in conjunction with the accompanying drawings.

Figure 2:
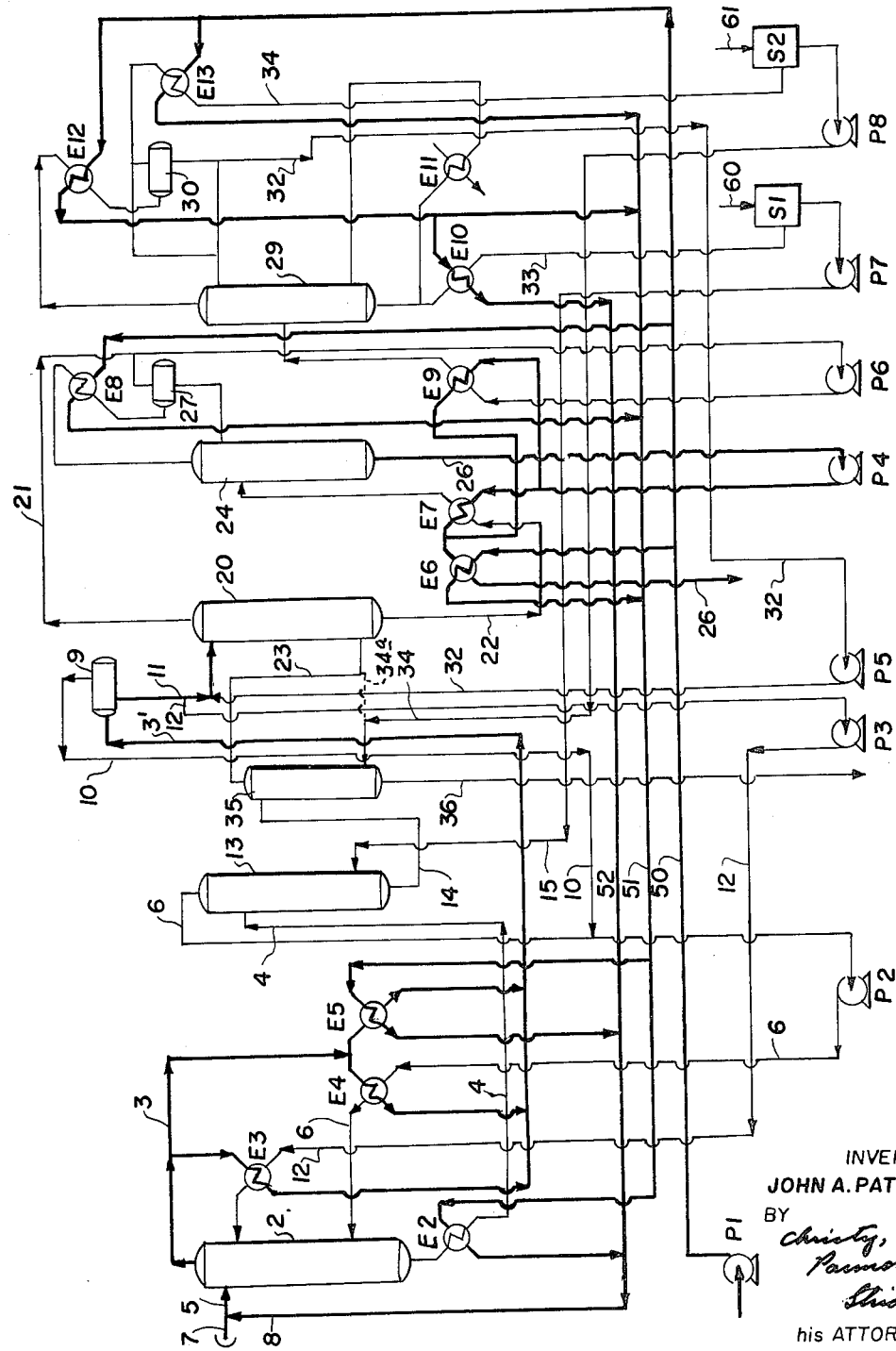

In the accompanying drawings which are schematic diagrams:

FIG. 1 is a basic schematic flow diagram illlustrating the sequence of steps but omitting for simplification much of the apparatus, such as heat exchangers which contribute to certain functions and the economics of the operation, but which can be disregarded for explanation of the more fundamental aspects of the method; and FIG. 2 is a condensed schematic diagram similar to FIG. 1 but showing a more complete embodiment of the apparatus.

In FIG. 1, 2 designates a countercurrent flow tower having an outlet pipe 3 at the top, an outlet pipe 4 at the bottom, an inlet pipe 5 near the top, and an inlet pipe 6 near the bottom.

Raw sea water or other saline solution, after being first heated, is injected into the upper portion of the tower 2 through pipe 5. I have indicated at 7 a heater, which heats the sea water to a temperature above its boiling point. Preferably heating is effected by direct injection of superheated steam, supplied through pipe 8 from a source, not shown, to the injector 7, but a heat exchanger may be used.

Through pipe 6 hydrophilic solvent, designated solvent A, is introduced into the tower 2. As pointed out above, this solvent is preferably n-butyl alcohol.

The alcohol flows upwardly against the descending column of salt water and the two streams intimately mix. Temperature and pressure conditions are established to maintain a temperature of the order of 250° F. in the upper end of the tower. At this temperature the solvent A, assuming it to be butyl alcohol, has a maximum affinity for water, so that it dissolves water out of the solution and rejects the salt. At the same time some of the alcohol will be dissolved in the water. There is therefore removed from the top of the tower through pipe 3 an extract comprised of the alcohol and water, and from the bottom through pipe 4 is discharged a bottom stream or raffinate comprising water in which the salt is concentrated, along with some solvent. This separation into top and bottom streams occurs by reason of the salt solution being heavier than the extract solutions. For convenience I term the raffinate from tower 2 the first stage brine.

Through pipe 3 the extract is carried into a decanting vessel 9 having an outlet 10 at the top and an outlet 11 at the bottom. Here the extract comprising alcohol and water, and being cooler, separates by gravity into a top phase in which alcohol predominates and a bottom phase in which water predominates.

More specifically the water-in-alcohol phase of the extract leaving the tower is a saturated solution. In its flow to the decanter it cools and releases water it is no longer capable of dissolving. The top stream from the decanter 9 is therefore comprised largely of butyl alcohol, and I term this stream which is carried off through pipe 10, wet butyl alcohol.

The liquid in the bottom of the decanter 9 is comprised predominantly of water with butyl alcohol in solution. It is withdrawn through pipe 11 while a side stream from this pipe refluxes some of it through a pipe 12 to the upper portion of the tower 2 to improve the selective action of the solvent as hereinafter more fully explained.

The first stage brine from tower 2 is carried through pipe 4 to the upper portion of a second countercurrent liquid contact tower 13 similar to 2 but smaller. This tower, in addition to having the brine inlet pipe 4 near the top, has the outlet pipe 6 at its top leading to the first tower 2. It has a discharge pipe 14 at its bottom, and also has an inlet pipe 15 near its lower end for the introduction of butyl alcohol in the brine. The source of this butyl alcohol will be later explained.

The wet butyl alcohol from the decanter discharged into pipe 10 joins pipe 6 so as to be carried directly back to tower 2 and rises countercurrent to the raw salt water.

In a sense, tower 13 is an extension of tower 2, since the solvent A continuously travels countercurrent to a downwardly-flowing stream of increasingly saline water, but it would be more difficult to secure the same temperature distribution in a single tower than can be provided by separate towers, and as will hereinafter more fully appear, recovery of heat from the first stage brine contributes to the economy of the operation.

As before mentioned, the bottom flow from the decanter 9 through pipe 11 is the flow in which water is the predominant phase, and is the stream from which the rectified water is derived. It is comprised principally of water which is rejected by the A solvent as it cools and the water which carries solvent A in solution. Aside from the reflux stream 12, pipe 11 carries the water and solvent stream to the upper portion of a third countercurrent flow tower 20 which also is similar to tower 2, and which in addition to the inlet pipe 11, has an outlet 21 at the top, a discharge pipe 22 at the bottom, and a solvent inlet pipe 23 near the bottom.

The second or B solvent is introduced into the tower 20 through pipe 23. This solvent, unlike solvent A, is not miscible with water to any substantial extent, and water and solvent B are completely or almost completely mutually insoluble. Since it has no affinity for water it is said to be hydrophobic. Its boiling point is below that of solvent A and below the boiling point of water. It is pointed out above that this solvent readily dissolves butyl alcohol and it will extract butyl alcohol from a water-butyl alcohol solution. It is preferably a liquid hydrocarbon of the class above mentioned, of which hexane, benzene, etc. are examples, and benzene is quite satisfactory for the purpose since it is relatively cheap and its cost is less than that of butyl alcohol.

In tower 20 the rising stream of solvent B flows countercurrent to the descending effluent from the decanter 9. The benzene, assuming solvent or elutant B to be benzene, dissolves or elutriates the butyl alcohol in the descending stream, leaving only water to be removed from the bottom of column 20 through pipe 22. The water has thus been separated from the salt by solvent A and separated from solvent A by solvent B which has little or no affinity for the water. The extract from the top of tower 20 carried off through pipe 21 is comprised of a mixture of the two solvents along with some water and I refer to this as mixed wet solvents.

The desalinated water discharged from countercurrent contact tower 20 may have small amounts of benzene entrained or dissolved therein, along with a possible remaining trace of butyl alcohol. Therefore the water from tower 20 flows through pipe 22 into the upper portion of a fractionating column 24. This is of usual construction having a heater or boiler 25 at the bottom with an outlet pipe 26 through which the rectified or potable water is discharged. At the top of this column is a usual condensing and refluxing system including a decanter 27. Most of the water which may be in the overhead of the column 25 will be refluxed to the column from the bottom of the decanter while any solvents, or solvents combined with water, are carried through pipe 28 to combine with the wet mix of solvents in pipe 21.

Pipe 21 enters the upper portion of a second conventional fractionating column 29 which has a condensing-refluxing system for the overhead product, including a decanter 30. There is a heater indicated at 31. The liquid removed from the bottom of the decanter 30 comprising water with some benzene is recycled through pipe 32 to pipe 11, where it combines with the bottom stream from decanter 9 and enters the tower 20. Bottoms from the column 29 comprise wet butyl alcohol which is carried through pipe 33 to the solvent inlet connection 18 near the lower end of column 13. The top liquid from the decanter 30 is benzene or benzene and water.

The benzene from decanter 30 is carried through pipe 34 to the lower portion of a fourth countercurrent liquid contact tower 35 similar to column 2, but smaller. In addition to pipe 34, this tower has a brine discharge pipe 36 at the bottom, and an inlet near the top in which pipe 14 terminates. There is an outlet provided by pipe 23 at the top.

In tower 35 the raffinate or brine, which might be called the second stage brine from the bottom of tower 13 flows down against a rising current of benzene flowing through pipe 33 from the still 29. This tower importantly effects the economy of the process, since the benzene will remove any small amount of butyl alcohol carried over from tower 13. The extract from tower 35 is comprised of wet benzene with a small amount of dissolved butyl alcohol that is entirely insufficient to affect the selectivity of the B solvent in tower 20. Instead of all of the benzene being introduced into tower 35, only part of it may enter this tower and the remainder is then bypassed through pipe 34a indicated by dotted lines in the drawings.

The discharge from tower 35 through pipe 36 is concentrated brine, or water in which the salt rejected by solvent A is contained. If there is a trace of solvent in this brine, it will be the B solvent or benzene, which is cheaper than butyl alcohol. The final removal of butyl alcohol in tower 35 justifies the provision of this tower in the system, since discarding the brine from the bottom of tower 13 could result in a possible waste of butyl alcohol. With tower 35 in the system any loss of solvent in the brine is benzene which is the cheaper of the two solvents, and with the saving effected in this way in a plant processing many thousands of gallons of water per day this is an important economic factor.

This then describes the fundamentals of the system and method. Make-up A solvent would desirably be injected into pipe 33 and make-up B solvent may be introduced into pipe 34.

Essentially the process as above described comprises contacting the raw salt water at elevated temperature, i.e., the temperature at which the hydrophilic solvent has the maximum affinity for water, which in the case of butyl alcohol is of the order of 250° F., and under pressure sufficient to prevent vaporization. This produces an extract and a brine. The extract is cooled to a temperature where the solvent will release much of the dissolved water. The extract separates in the decanter to a solvent phase and a water phase, solvent predominating in the solvent phase and water in the water phase. Since some of the A solvent is carried out with the brine, the first stage brine is also cooled in entering tower 13 to free some of the water in the brine. The hydrophilic solvent from the distillation tower is therefore first introduced through pipe 6 into the raw salt water. Wet solvent from the decanter is recycled to pipe 6 to combine with the extract from tower 13. Next the second stage brine is contacted with the hydrophobic solvent to remove the last trace of the first solvent and then is brought into contact with the water phase from the decanter where it separates the remaining hydrophilic solvent from the water.

Further steps then involve the removal of traces of solvent from the water and the separation of the mixed solvents back to their separate states for recycle, the solvent phase of the first decanter and the hydrophilic solvent from the separation of the mixed solvents being preferably recycled together.

The preferred method thus utilizes the selective action of successive solvents and the increased capacity of the "A" solvent or alcohol for water at high temperatures and decreased capacity for water at lower temperatures, making possible an initial separation of water and solvent by decanting. This is important from the economic standpoint since it reduces the size of the still for separating the mixed solvents. From an operating standpoint it is in most cases preferable to raise the temperature of the raw salt water by direct steam injection, although other methods, such as a heat exchanger or direct firing could be used. Direct steam injection, while requiring water to generate steam, simplifies the initial cost and the water from the condensation of the steam is recovered.

The recuperation of heat at various points is important to the economy of the process, especially in scarce fuel areas. FIG. 2 is a more complete but schematic diagram of the apparatus shown in FIG. 1, and shows heat exchangers, pumps and storage vessels. As in FIG. 1, the heavier lines indicate lines concerned with the flow of water. Heat exchangers are designated from $E^2$ to $E^{13}$ inclusive. Pumps are designated $P^1$ to $P^8$ inclusive. Two storage tanks are indicated as $S^1$ and $S^2$ for butyl alcohol and benzene, respectively.

Raw salt water is pumped through pump $P^1$ into line 50. It flows through heat exchangers $E^6$, $E^8$, $E^{12}$ and $E^{13}$ in parallel into warm salt water line 51. From 51 it flows in parallel through heat exchangers $E^2$, $E^5$ and $E^{10}$ into hot salt water line 52. In flowing through one system of heat exchangers the raw salt water is first warmed and then heated for delivery to the steam injector 7 for injection into tower 2.

The hot first stage brine flows through heat exchanger $E^2$ to raise the temperature of the warm raw water. Pipe 3 from the top of tower 2 branches three ways to provide the heating medium in heat exchangers $E^3$, $E^4$ and $E^5$, the three streams being brought together in pipe 3' and discharged into decanter 9. Water from the bottom of tower 20 is heated in exchanger $E^7$ before entering the fractionating column 24. Hot water from the bottom of this column flows through pump $P^4$ and through heat exchangers $E^7$ and $E^9$ in parallel as the heating medium and then through heat exchanger $E^6$. The raw water passing through exchanger $E^8$ condenses vapors from column 24. Raw water is also the condensing fluid in exchanger $E^{12}$ for vapors from column 29, and the condensate from column 29 is the heating fluid in heat exchanger 13, so that the benzene is cooled before flowing into storage vessel $S^2$. Heat exchanger $E^9$ heats the mixed solvents before they enter column 29.

Heat exchanger $E^3$ heats the reflux that is circulated from the bottom of decanter 9 through pump $P^3$ to column 2. Pump $P^5$ forces the recycle from the top of column 29 to pipe 11 to enter the upper portion of tower 20.

Butyl alcohol from the bottom of column 29 exchanges its heat in heat exchanger $E^{10}$ to raise the temperature of the warm raw water as above explained, and then flows to storage vessel $S^2$. Pump $P^7$ forces the butyl alcohol to pipe 15 and the lower portion of tower 13. Heat exchanger $E^{11}$ may be heated by steam to heat a closed circuit at the bottom of column 29.

Make-up solvents, to the extent necessary, can be injected at suitable locations. For example butyl alcohol may be supplied through pipe 60 on vessel $S^1$ and benzene through pipe 61 into vessel $S^2$.

The foregoing is illustrative of a form of apparatus for the practice of the method. Steam lines to the extent employed are not shown, nor are the condensed steam return lines. More elaborate heat-recovering equipment known to the art, such as compressor systems, may also be used to recover heat from vapors generated in column 29.

Sea water contains approximately 35,000 parts of various salts per million gallons. The Office of Saline Water of the United States Government defines as potable water, water which contains not more than 500 parts of impurities per million. The process here described is expected to produce water having impurities well below this, of the order of 100 parts per million.

Important to the overall reduction of salt in the water is the reflux from pipe 11 at the bottom of the decanter to the upper portion of tower 2. None of the salt constituents of sea water are completely insoluble in butyl alcohol, although sodium chloride, magnesium sulphate, calcium sulfate, potassium sulphate and calcium carbonate are almost completely insoluble in it. Some other mineral constituents are more so and complete elimination thereof cannot be expected in commercial operations. Stated in simple terms, it cannot be expected that a clean separation of dissolved water and brine can be made in the top of tower 2 so that some salt water or brine will leave the top of this tower with the extract. The upper phase in the decanter will contain about 23.5% water and 76.5% butyl alcohol. The bottom phase will contain about 93.5% water and 6.5% alcohol. At the start-up of the process most of any salt water in the extract will appear in the bottom phase from the decanter, but the salt will be much less concentrated than in the raw salt water. By refluxing part of this stream there will be still less salt water or brine in the extract as the operation progresses until a condition of equilibrium exists when the salt in the bottom phase is far below the amount at start-up. Without refluxing some of the bottom phase this reduction of salt in the extract would not proceed to such inconsequential amounts. In any given plant the volume of the bottom phase from the decanter that is refluxed will be adjusted to the optimum rate. At start-up all or a major part of the bottom phase might be refluxed and the amount of reflux reduced as equilibrium is approached.

Instead of refluxing water from the bottom phase of the decanter, water from a subsequent step could be recycled, but this would be less economical because of the presence of some butyl alcohol in the reflux and the obvious advantage of getting rid of the maximum amount of salt as early as possible in the processing.

Also while the Office of Saline Water does not list calcium chloride as being present in appreciable amounts in sea water, the concentration of chlorine ions in the brine along with calcium compounds may lead to the formation of calcium chloride in towers 2 and 20 and the reflux of some of the water phase from the decanter 9 to the tower 2 will reduce the formation of calcium chloride by reducing the concentration of chlorine ions. Calcium chloride is relatively more soluble in butyl alcohol than is sodium chloride, for which reason it is desirable to keep conditions favorable to its formation as low as possible.

While the invention is primarily directed to the recovery of water, it may be used where the production of a concentrated brine is important to the recovery of salt from sea water or other saline solution.

While I have described the operation in connection with butyl alcohol and benzene as solvents A and B respectively, other solvents may be used, the process utilizing physical rather than chemical processes. The apparatus may be arranged and constructed in various ways, but the system here shown is believed to give a maximum yield of water with a minimum loss of solvents.

From the foregoing it will be recognized that while I have shown and described in detail presently preferred embodiments of my invention, various changes and modifications may be made therein within the scope of the appended claims.

I claim:

1. The method of recovering water which is substantially salt-free water from a saline solution which comprises first contacting the salt water with a hydrophilic organic solvent having a hydrocarbon group and a terminal oxygen containing group to produce a saturated solution of water in solvent and then separating the hydrophilic organic solvent from the water by cooling the saturated solution to produce a solvent phase and a water phase and removing the solvent phase from the water phase and then contacting the water phase with a hydrophobic solvent for the hydrophilic organic solvent.

2. The method of recovering water which is substantially salt-free water from a saline solution which comprises first contacting the salt water with a hydrophilic solvent comprising an organic solvent having a hydrocarbon radical and a terminal oxygen containing group at an elevated temperature where the solvent has a maximum affinity for water, cooling the resulting solution of water in solvent to a temperature where the solvent has a lesser capacity to hold water in solution and decanting the cooled solution to produce a top phase and a bottom phase, recycling the top phase for contact with salt water and eluting the bottom phase with a hydrophobic solvent for the first solvent, separating the combined solvents from the water, and then separating the combined solvents from each other for reuse.

3. The method of recovering water which is substantially salt-free water from a saline solution which comprises:

(a) contacting the salt water with a hydrophilic solvent comprising an organic compound having a hydrocarbon radical attached to a terminal oxygen-containing group to effect an initial separation of water from the saline solution and produce an extract of water in solvent, (b) cooling the extract and decanting it to effect initial separation of some of the hydrophilic solvent from the extract (c) and then dissolving the remainder of the hydrophilic solvent from the residue of the extract after decanting with a hydrophobic solvent to effect a separation of water from the hydrophilic solvent (d) and removing the combined hydrophilic and hydrophobic solvents from the water.

4. The method of recovering water which is substantially salt-free water from a saline solution as defined in claim 3 wherein some water from a subsequent step is recycled to combine with the salt water where it is first contacted with hydrophilic solvent.

5. The method of recovering water which is substantially salt-free water from a saline solution which comprises initially contacting the raw salt water above normal boiling temperature and under pressure sufficient to prevent boiling with a hydrophilic solvent comprising a liquid organic compound having a hydrocarbon radical with more than two carbon atoms attached to an oxygen containing terminal group to produce a solution of water-in-solvent and a first stage brine, decanting the water-in-solvent solution at a lower temperature and separating it into a top stream and a bottom stream, recycling the top stream into the first stage brine and producing a second stage brine and a stream of combined water and solvent, circulating the water and solvent from the first stage brine into contact with the raw salt water, whereby the hydrophilic solvent first contacts the first stage brine and then the raw salt water, circulating the second stage brine into contact with a hydrophobic solvent for said hydrophilic solvent to remove hydrophilic solvent from the second stage brine, circulating the hydrophobic solvent after it has contacted the second stage brine into contact with the bottom stream from the decanting stage, and separating the water from the combined solvents.

6. The method of recovering water which is substantially salt-free water from a saline solution as defined in claim 5 in which the water last separated is heated to drive off any residual solvents contained therein.

7. The method of recovering water which is substantially salt-free water from a saline solution as defined in claim 5 in which the combined solvents when separated from the water are then separated from each other for reuse.

8. The method of recovering water which is substantially salt-free water from a saline solution as defined in claim 5 in which residual solvents remaining in the water are distilled off and mixed with the combined solvents separated out of the water, and then subjecting all of the solvents to fractional distillation to separate the hydrophobic and hydrophilic solvents for reuse.

9. The method of recovering water which is substantially salt-free water from a saline solution which comprises flowing heated raw salt water and an organic solvent for water of a character which rejects the salt to produce a heated water-in-solvent extract and a brine containing some of the solvent, the solvent being a higher alcohol having at least three carbon atoms, cooling the extract and decanting it to produce therefrom a top stream which is predominantly said solvent and a bottom stream which is predominantly water, recycling the top stream to the raw salt water and elutriating the brine and the bottom stream only with a hydrophobic eluant to separate the first solvent from the brine and from the water.

10. The method of recovering water which is substantially salt-free water from a saline solution as defined in claim 9 in which the first solvent is passed countercurrent to the brine at a temperature below the normal boiling temperature of water before it contacts the raw water at the higher temperature and before the elutant has been passed through the brine and the top stream from the decanting step is combined with the first solvent after said first solvent has flowed countercurrent to the brine.

11. The method of recovering water which is substantially salt-free water from a saline solution as defined in claim 10 in which a side stream from the bottom stream from the decanting step is recycled to mix with the raw salt water and hydrophilic solvent where they are brought into contact.

12. The method of recovering water which is substantially salt-free water from a saline solution as defined in claim 5 in which the hydrophilic solvent is a high boiling point polar organic compound having a hydrocarbon group with at least three carbon atoms attached to an oxygen containing terminal group compound and the hydrophobic solvent is a hydrocarbon having a boiling point below the normal boiling temperature of water.

13. The method of recovering water which is substantially salt-free water from a saline solution as defined in claim 5 in which the raw salt water is used to cool water-in-solvent solution before it is decanted and to cool the first stage brine and thereby preheat the water.

14. Apparatus for recovering water which is substantially salt-free water from a saline solution comprising a countercurrent liquid contact tower, means for injecting raw salt water at a temperature above ambient temperature into the upper portion of said tower, means for removing brine from the lower portion of said tower, means for supplying a hydrophilic solvent to the lower portion of said tower, outlet means for withdrawing water and solvent extract from the top of said tower and cooling it, a decanter to which said outlet means is connected for receiving the extract and separating it into a top stream and a bottom stream, means for withdrawing the top stream from the decanter and recycling it to the lower portion of said tower, means for withdrawing the bottom stream from the decanter, a second column similar to the first, said last-named means being connected to the upper portion of the second tower, a water discharge pipe at the bottom of the second tower, means for injecting a hydrophobic solvent into the lower portion of the second tower, and means for removing a stream of mixed solvents from the top of the second tower.

15. Apparatus for recovering water which is substantially salt-free water from a saline solution as defined in claim 14 wherein the means for discharging brine from the first tower is connected to a third counterflow contact tower, said third contact tower having a connection for circulating extract from the top thereof to the lower portion of the first tower, the third tower having a brine outlet at the bottom, said third tower having a connection near its lower end through which hydrophilic solvent flows first into said third tower before flowing as extract therefrom to the first tower, means for separating the mixed solvents from the second tower, means for recycling the hydrophilic solvent to said connection on the third tower, and means for recycling the hydrophobic solvent to the second tower.

16. Apparatus for recovering water which is substantially salt-free water from a saline solution as defined in claim 15 wherein there is an additional tower into which the brine from the bottom of the third tower flows, means for conducting at least some of the hydrophobic solvent first to the lower portion of the said additional tower, means for circulating the hydrophobic solvent from the top of the said additional tower to provide at least some of the total hydrophobic solvent supply to the second tower whereby at least some of the hydrophobic solvent first removes the residual hydrophilic solvent from the brine in the said additional tower before transferring it from the water in the second tower.

17. Apparatus for recovering water which is substantially salt-free water from a saline solution as defined in claim 16 characterized by the provision of a fractionating still means for distilling off solvent from the water from the second tower with the solvent as overhead product, the means for separating the solvents comprising a second distillation column into which the overhead from the first distillation means is also connected, said apparatus including heat exchangers for preheating the raw salt water by extraction of heat from the extract flowing from the first tower to the first decanter and from the overhead of each of said stills, and another heat exchanger for preheating the raw salt water from the brine discharged from the first tower.

18. The method of recovering water which is substantially salt-free water from a saline solution which comprises flowing raw salt water countercurrently to normal butyl alcohol under pressure at a temperature above the normal boiling point of water and producing an extract of butyl alcohol and water and also a brine containing butyl alcohol, cooling the extract and decanting it into an alcohol phase at the top and a water phase at the bottom, recycling the alcohol stage countercurrently through the brine to the raw salt water, flowing the water phase concurrently to benzene to produce a stream of mixed normal butyl alcohol and benzene and a stream of water, and subsequently separating the alcohol and benzene by distillation.

19. The method of recovering water which is substantially salt-free water from a saline solution as defined in claim 18 wherein the benzene is flowed countercurrently through the brine after the normal butyl alcohol has been passed through the brine to extract normal butyl alcohol from the brine, the benzene then being used for said countercurrent contacting of the water phase from the decanter.

20. The method of recovering water which is substantially salt-free water from a saline solution as defined in claim 18 in which a part of the water phase is refluxed to combine with the extract of normal butyl alcohol and water.

References Cited by the Examiner
UNITED STATES PATENTS 2,967,825    1/1961    Baniel _____ 210—21

OTHER REFERENCES

Report 22 Research on Liquid-Liquid Extraction for Saline Water Conversion, by United States Department of Interior, December 1958, pages 1–8 relied upon.

Richter: Textbook of Organic Chemistry, 3rd ed., copyright 1938, 1943 and 1952, by Geo. H. Richter (pp. 78–80 relied upon).

Saline Water Conversion Number 27, Advances in Chemistry Series, edited by The American Chemical Society, 1960 (pp. 40–42, particularly 42 relied upon).

MORRIS O. WOLK, *Primary Examiner.*

EDWARD G. WHITBY, *Examiner.*